(12) United States Patent  
Pithawala et al.

(10) Patent No.: US 6,747,957 B1  
(45) Date of Patent: Jun. 8, 2004

(54) NETWORK AVAILABILITY MONITOR (75) Inventors: Burjiz Pithawala, San Jose, CA (US); Faiyaz Shahpurwala, Pleasanton, CA (US); Jacob Hartinger, Palo Alto, CA (US); Narayanan Thyagarajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/561,458

(22) Filed: Apr. 28, 2000

(51) Int. Cl.[7] .............................. H04J 1/16; H04L 12/28
(52) U.S. Cl. ..................... 370/252; 370/400; 709/224
(58) Field of Search ................................ 371/216, 218, 371/221, 236, 241, 252, 244, 250, 389, 392, 400, 401; 709/223, 224, 225, 227, 238, 239, 242

(56) References Cited

U.S. PATENT DOCUMENTS

| | | | | |
|---|---|---|---|---|
| 5,452,287 A | * | 9/1995 | DiCecco et al. | 370/252 |
| 5,627,766 A | * | 5/1997 | Beaven | 702/122 |
| 5,710,885 A | * | 1/1998 | Bondi | 709/224 |
| 5,802,286 A | * | 9/1998 | Dere et al. | 370/254 |
| 5,845,081 A | * | 12/1998 | Rangarajan et al. | 370/258 |
| 5,892,753 A | * | 4/1999 | Badt et al. | 370/400 |
| 5,909,549 A | * | 6/1999 | Compliment et al. | 709/223 |
| 5,968,126 A | * | 10/1999 | Ekstrom et al. | 370/409 |
| 6,212,171 B1 | * | 4/2001 | LaFollette et al. | 370/252 |
| 6,226,681 B1 | * | 5/2001 | Koga et al. | 709/236 |
| 6,269,099 B1 | * | 7/2001 | Borella et al. | 370/401 |
| 6,337,861 B1 | * | 1/2002 | Rosen | 370/389 |

FOREIGN PATENT DOCUMENTS

GB  2364851 A  *  7/2000

* cited by examiner

*Primary Examiner*—Min Jung  
*Assistant Examiner*—Andy Lee (57) ABSTRACT

A method and system for measuring availability of a high-availability network that includes interconnected routers and switches. One embodiment of the present invention provides a network availability monitoring device that is coupled to the network. In this embodiment, ICMP (Internet Control Message Protocol) pings are sent from the network availability monitoring device at regular intervals to the leaf nodes only. Network availability is then determined based on the total number of ICMP pings attempted and the total number of ping responses returned. In this way, when a non-leaf node goes down, the network availability monitoring device may not report this as non-availability if leaf nodes are not affected. One embodiment of the present invention employs a rule-based detection algorithm that detects leaf nodes in the network. Areas of the network that share similar geographic, topology or service characteristics may be grouped together as availability groups. Group availability can be determined based on a total number of ICMP pings sent to the leaf nodes of the availability groups and a total number of ping responses sent by the leaf nodes of the groups. The present invention also provides for an auto-annotation mechanism that assists network engineers in pinpointing root causes of a network problem.

20 Claims, 8 Drawing Sheets

```
BEGIN
  ↓
510 — Select a device of the network and perform an
       SNMP walk to gather IP address and subnet mask
       information for each interface of the device
  ↓
520 — Calculate subnet address for each interface of the
       device
  ↓
530 — Cache the device name, interface IP address and
       interface subnet address for each interface
  ↓
535 — Have all the devices been processed? — NO → (loop back)
  ↓ YES
540 — Go through the cached information and search for
       interfaces that share the same IP subnet
  ↓
550 — Remove interfaces that share the same IP subnet
       from the cache memory
  ↓
560 — Store the unremoved interface information in an IP
       address table for leaf-nodes
  ↓
END
```

Previous Results

| Device Name | Interface | IP Address | DownTime | UpTime |
|---|---|---|---|---|
| 172.16.65.13 | Ethernet 1/1 | 180.0.01 | 04/12/2000 11 03 44 | 04/12/2000 11 20 24 | nsa-gw.cisco.com 1.943 ms 1.041 ms 1.012 ms
171.68.28.85 1.326 ms 0.981 ms 0.887 ms
sjck-bbi1-gw1.cisco.com 1.237 ms 1.221 ms 1.208 ms
sjck-bbi1-gw2.cisco.com 1.124 ms 1.243 ms 1.086 ms
gaza-gw1.cisco.com 1.240 ms 1.150 ms 1.186 ms

Current Results ← 710 nsa-gw.cisco.com 1.943 ms 1.041 ms 1.012 ms
171.68.28.85 1.326 ms 0.981 ms 0.887 ms
sjck-bbi1-gw1.cisco.com 1.237 ms 1.221 ms 1.208 ms
sjck-bbi1-gw2.cisco.com 1.124 ms 1.243 ms 1.086 ms Correlated Events
Inventory Events
No inventory Change Happened During This Outage
Config Events ← 720

| Device | Timestamp | Configured By |
|---|---|---|
| | Wed Apr 12 11:01:40 2000 | PERIODIC |

Syslog Events ← 730

| Events | Type |
|---|---|
| LINEPROTO-5-UPDOWN | 2 |
| LINK-3-UPDOWN | 16 |
| X25-3-X25INT | 2 |

Cisco System

Update | Each

Document Done

NETWORK AVAILABILITY MONITOR

FIELD OF THE INVENTION

The present invention pertains generally to the field of high-availability networks. More specifically, the present invention pertains to methods and systems for measuring and improving availability of networks.

BACKGROUND OF THE INVENTION

The Internet is a worldwide collection of computer networks and gateways that generally use the TCP/IP suite of protocols to communicate with one another. The Internet allows easy access to media and data from a variety of sources, and is capable of delivering this information to the users wherever they may be. Some of the myriad functions possible over the Internet include sending and receiving electronic mail (e-mail) messages, logging into and participating in live discussions, playing games in real-time, viewing pictures, watching streaming video, listening to music, going shopping on-line, browsing different web sites, downloading and/or uploading files, etc.

Communication networks, such as the Internet, typically consist of routers and switches that route data and messages from one node of the network to another. Multiple paths usually exist between any two nodes of the network. Thus, even when some nodes of the network malfunction (e.g., go down), communications across the network generally remain unaffected. Unfortunately, however, even for the most perfectly designed networks, communications across parts of the network may break down when critical nodes malfunction.

In order to improve network reliability and stability, network engineers must be able to quantify and measure network availability. After the availability of the network is quantified and measured, network engineers can then make recommendations as to how to improve it. Measuring true network availability, however, requires constant monitoring of successful transmission from each point in the network to every other. Thus, it is impractical and infeasible to measure true network availability for large-scale networks that have hundreds or thousands of nodes.

Numerous methods of quantifying and measuring availability of a large network without requiring the monitoring of true network availability have been devised. One method is to measure the number of user minutes impacted by network outages over a certain period of time. In that method, availability is defined as a ratio of total impacted user minutes, or total non-impacted user minutes, divided by total user minutes for a certain period of time. One advantage of that method is that it can be used to measure availability of any network. However, that method requires impacted user minutes to be tabulated manually or programmatically by reviewing all help-desk trouble tickets. For a large network with a large number of users, the task of reviewing all help-desk trouble tickets can be very time consuming and costly. Further, the measurement of impacted user minutes by reviewing trouble tickets is, at least, partially subjective.

Figure 1:
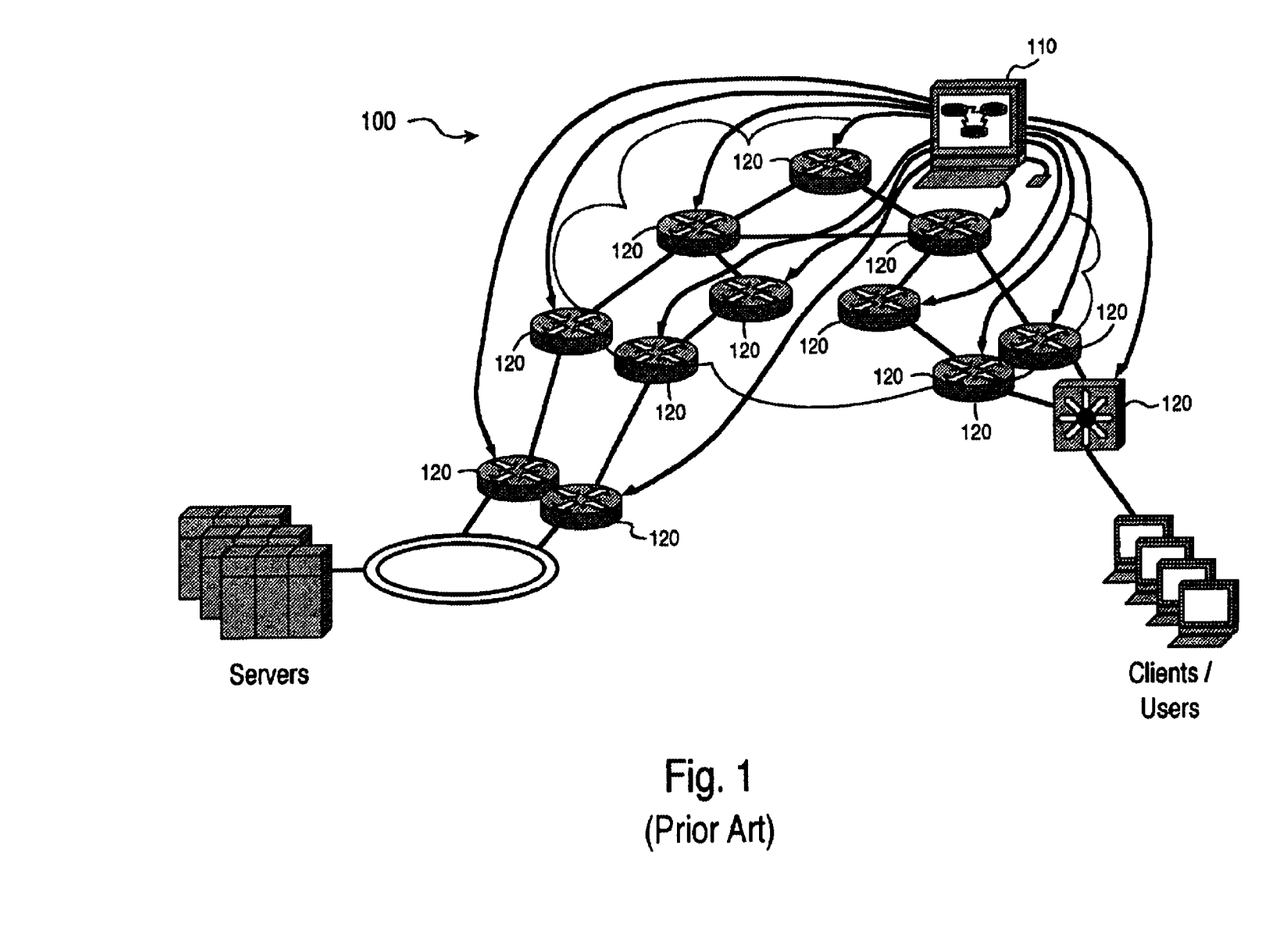
FIG. 1 illustrates the prior art method of measuring network availability based on device availability.

Another method of measuring availability of a network is to track the availability of all devices of the network. FIG. 1 illustrates the prior art method of measuring network availability based on device availability. As illustrated, the device availability method entails the use of a network monitoring device 110 to send pings to all devices 120 (e.g., routers, switches) within the network 100 to determine availability. The pings are sent at defined intervals and overall availability is determined by the ratio of pings returned divided by pings sent. The method, however, does not account for any redundancy in network design. Therefore, periods of non-availability may be counted when they are not user impacting. In fact, estimated availability may be slightly higher in non-redundant networks than in high-availability redundant networks. Another disadvantage is that, because every single device/interface in the network requires monitoring, high traffic load within the network may result. In addition, device availability does not reflect user perception of network availability because users generally perceive outages as loss of connectivity to network resources.

Yet another method of measuring availability of a network is to calculate, on average, how long links have been up in the network using SNMP (Simple Network Management Protocol). Network availability may then be calculated for all trunk and backbone links by averaging the amount of link uptime for the trunks. Server availability may be calculated by link availability on all server ports. That method can also be used on all types of networks. However, a disadvantage of that method is that network availability is determined based on averaging, and is therefore less accurate. More importantly, link status does not reflect routing problems, which are some of the most common causes of network outages.

Yet another method of measuring availability of a network involves measuring application availability. Application availability measurement is done by making an OSI (Open Systems Interconnection) level 7 application call to an application server and waiting for an appropriate response. Availability is determined by the ratio of successful receipt of information for the periodic calls. An advantage of gauging network availability with application availability is that that method can be used for any type of network. However, a significant drawback is that it may not measure the availability of networks alone. For instance, application errors may be falsely attributed to errors in the network. Furthermore, application availability measurement is not scaleable.

Therefore, what is needed is a novel method and system for measuring availability that does not have limitations of the above mentioned techniques. What is further needed is a novel standard for defining network availability that can be used as basis of service level agreements (SLAs). What is yet further needed is a method and system for assisting network engineers in identifying root causes of network problems in a quick and accurate manner such that availability of a network can be improved.

SUMMARY OF THE DISCLOSURE

Accordingly, the present invention provides a method and system for measuring availability of a high-availability network that is scaleable, accurate and objective. The present invention provides a standard measurement method that can be used as an industry standard for comparing stability of networks. The present invention also provides an auto-annotation mechanism that creates failure records correlating network availability data and other device activity data such that the root cause of network problems can be quickly identified and resolved.

One embodiment of the present invention provides a network availability monitoring device for coupling to a core segment of a network. In the present embodiment, a leaf node detection (or, edge node detection) process is first carried out by the network availability monitoring device to determine the leaf nodes (also known as "edge devices") of the network. Then, the network availability monitoring device sends test packets (e.g., ICMP "Internet Control Message Protocol" pings for IP networks) at regular intervals to the leaf nodes to determine their availability. Test packets, however, are not targeted at non-leaf nodes (also known as "non-edge devices"). Network availability for the network as a whole is then determined based on the total number of test packets sent to the leaf nodes and the total number of returned responses. It should be noted that, in the present embodiment, availability of non-leaf nodes does not directly affect the calculation of network availability. For instance, the network availability monitoring device may not report a malfunctioning intermediary device as non-availability if the leaf nodes are not affected.

One embodiment of the present invention employs an automatic rule-based leaf node detection (or, edge node detection) process that detects leaf nodes in the network. Automatic edge-detection allows administrators to easily create availability groups and measure network availability. Without automatic edge-detection, administrators would face a major labor-intensive task of identifying edge IP addresses.

In accordance with another embodiment of the present invention, leaf nodes that share similar geographic, topology or service characteristics may be placed in a common availability group. Availability groups are valuable because they allow the organization to measure different specific areas of the network that typically have different availability needs or different support requirements. For instance, all LAN leaf nodes may be placed in a LAN availability group, and all WAN leaf nodes may be placed in a WAN availability group. Network availability is determined for the availability group based on the number of test packets sent to the availability group and the number of test packet responses received. In one embodiment, network availability for an availability group is calculated by averaging all the availability for leaf nodes within the group during a certain data collection period.

The present invention also provides mechanisms that allow network managers or network service providers to perform quality improvements within a network. Particularly, the present invention provides an auto-annotation process that helps identify the root cause of a network problem based on a current set of network availability information. In one embodiment, auto-annotation includes the steps of creating a failure record for each period of non-availability for a leaf node device, and "annotating" the record with relevant network management information that is useful for root cause analysis. Identifying the root cause of a network problem facilitates the debugging and trouble-shooting of the network problem, and provides an excellent resource for network engineers in preventing network outages.

Embodiments of the present invention include the above and further include a computer-readable medium having contained therein computer-readable codes for causing a computer system to perform a method of monitoring availability of a network. The method includes the steps of: (a) determining the leaf nodes and non-leaf nodes of the network; (b) monitoring availability of the leaf nodes; and (c) generating network availability data for the network as a whole based on availability of the leaf nodes without monitoring availability of the non-leaf nodes.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one of ordinary skill in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those of ordinary skill in the data processing arts to most effectively convey the substance of their work to others of ordinary skill in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories or registers or other such information storage, transmission, or display devices.

Computer System Platform

Figure 8:
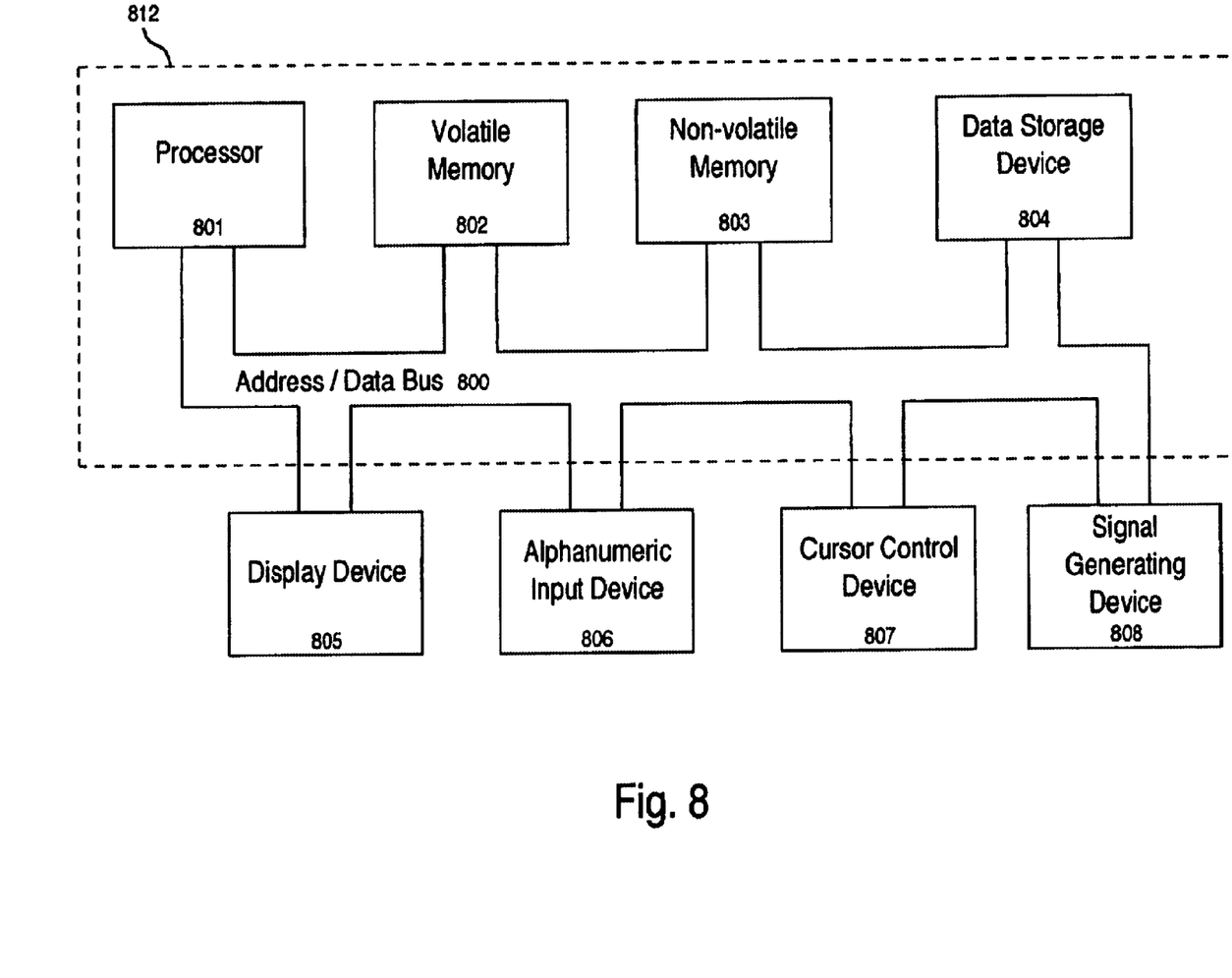
FIG. 8 illustrates an exemplary computer system platform upon which embodiments of the present invention may be practiced.

Portions of the present invention are comprised of computer-readable and computer executable instructions which reside, for example, in computer-usable media of a computer system. FIG. 8 illustrates an exemplary computer system 812 on which embodiments (e.g., process 300, process 400, process 500 and process 600) of the present invention may be practiced. It is appreciated that system 812 of FIG. 8 is exemplary only and that the present invention can operate within a number of different computer systems including general purpose computer systems, embedded computer systems, and stand alone computer systems specially adapted for measuring and monitoring network availability data.

Computer system 812 includes an address/data bus 800 for communicating information, a central processor 801 coupled with bus 800 for processing information and instructions, a volatile memory 802 (e.g., random access memory RAM) coupled with the bus 800 for storing information and instructions for the central processor 801 and a non-volatile memory 803 (e.g., read only memory ROM) coupled with the bus 800 for storing static information and instructions for the processor 801. Computer system 812 also includes a data storage device 804 ("disk subsystem") such as a magnetic or optical disk and disk drive coupled with the bus 800 for storing information and instructions. Data storage device 804 can include one or more removable magnetic or optical storage media (e.g., diskettes, tapes) which are computer readable memories. Memory units of system 812 include volatile memory 802, non-volatile memory 803 and data storage device 804. Logic of computer system 812 includes central processor 801 and processor executable codes stored within memory/storage units 802, 803 and 804.

Computer system 812 can further include an optional signal generating device 808 (e.g., a modem, or a network interface card "NIC") coupled to the bus 800 for interfacing with other computer systems. Also included in computer system 812 of FIG. 8 is an optional alphanumeric input device 806 including alphanumeric and function keys coupled to the bus 800 for communicating information and command selections to the central processor 801. Computer system 812 also includes an optional cursor control or directing device 807 coupled to the bus 800 for communicating user input information and command selections to the central processor 801. An optional display device 805 can also be coupled to the bus 800 for displaying information to the computer user. Display device 805 may be a liquid crystal device, other flat panel display, cathode ray tube, or other display device suitable for creating graphic images and alphanumeric characters recognizable to the user. Cursor control device 807 allows the computer user to dynamically signal the two dimensional movement of a visible symbol (cursor) on a display screen of display device 805. Many implementations of cursor control device 807 are known in the art including a trackball, mouse, touch pad, joystick or special keys on alphanumeric input device 806 capable of signaling movement of a given direction or manner of displacement. Alternatively, it will be appreciated that a cursor can be directed and/or activated via input from alphanumeric input device 806 using special keys and key sequence commands. The present invention is also well suited to directing a cursor by other means such as, for example, voice commands.

Network Availability Monitor

The present invention provides a method and system for monitoring and determining availability of a network. In comparison to other availability monitoring techniques, the method of the present embodiment provides significant advantages in scaleability and accounts for redundancy in the network. Further, network availability information generated by the methods of the present invention will be more accurate in reflecting user perceptions of availability of network resources. In addition, the method and system of the present invention can be used to measure the success of a network support organization at providing network service to end-users or servers.

Figure 2:
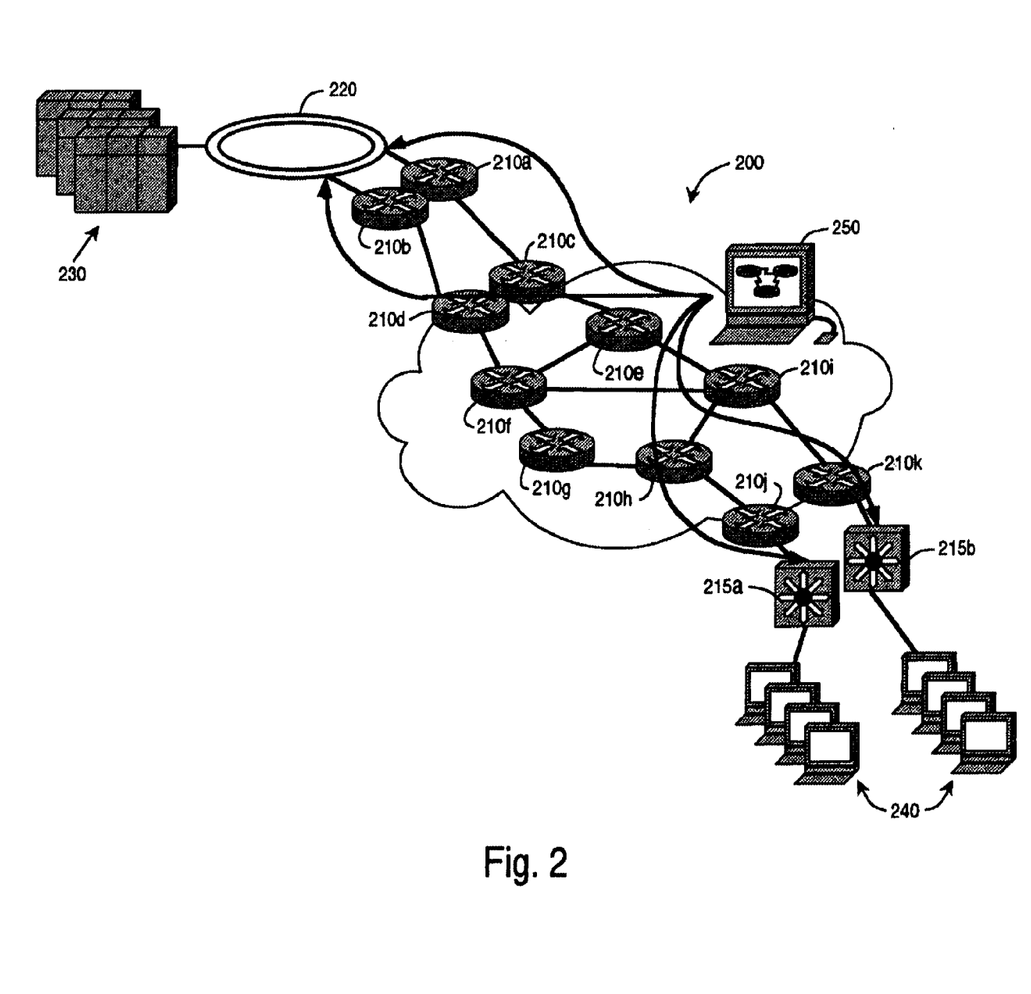
FIG. 2 illustrates a network in which embodiments of the present invention may be practiced.

FIG. 2 illustrates a network 200 in which the present invention may be practiced. As illustrated, network 200 includes a number of routers 210a–210k and switches 215a–215b. Routers 210a–210b are coupled to a local area network (LAN) such as a FDDI ("Fiber Distributed Data Interface") network 220 that is coupled to a number of servers 230. Switches 215a–215b are coupled to provide network access to user computers 240. Network 200 further includes a network availability monitoring device (or, "NAM") 250 that is placed near the core of the network 200 or on a reliable network segment. Significantly, in accordance with the present embodiment, NAM 250 measures availability to the leaf nodes (e.g., routers 210a–210b, switches 215a–215b) without monitoring availability of other devices that are in the core of the network. For instance, NAM 250 does not monitor the availability of router 210d.

Although the network illustrated in FIG. 2 only has one NAM, it should not be construed that only one NAM can be used for measuring availability of a network. Rather, it should be appreciated that more than one NAMs may be used for measuring the availability of a network. For instance, a network may have multiple geographic sub-networks that are interconnected by somewhat unreliable network segments. In that case, several NAMs should be placed near the cores of the geographic sub-networks for collecting network availability data. Availability data collected by each of the NAMs can then be pooled together to determine the overall network availability.

Figure 3:
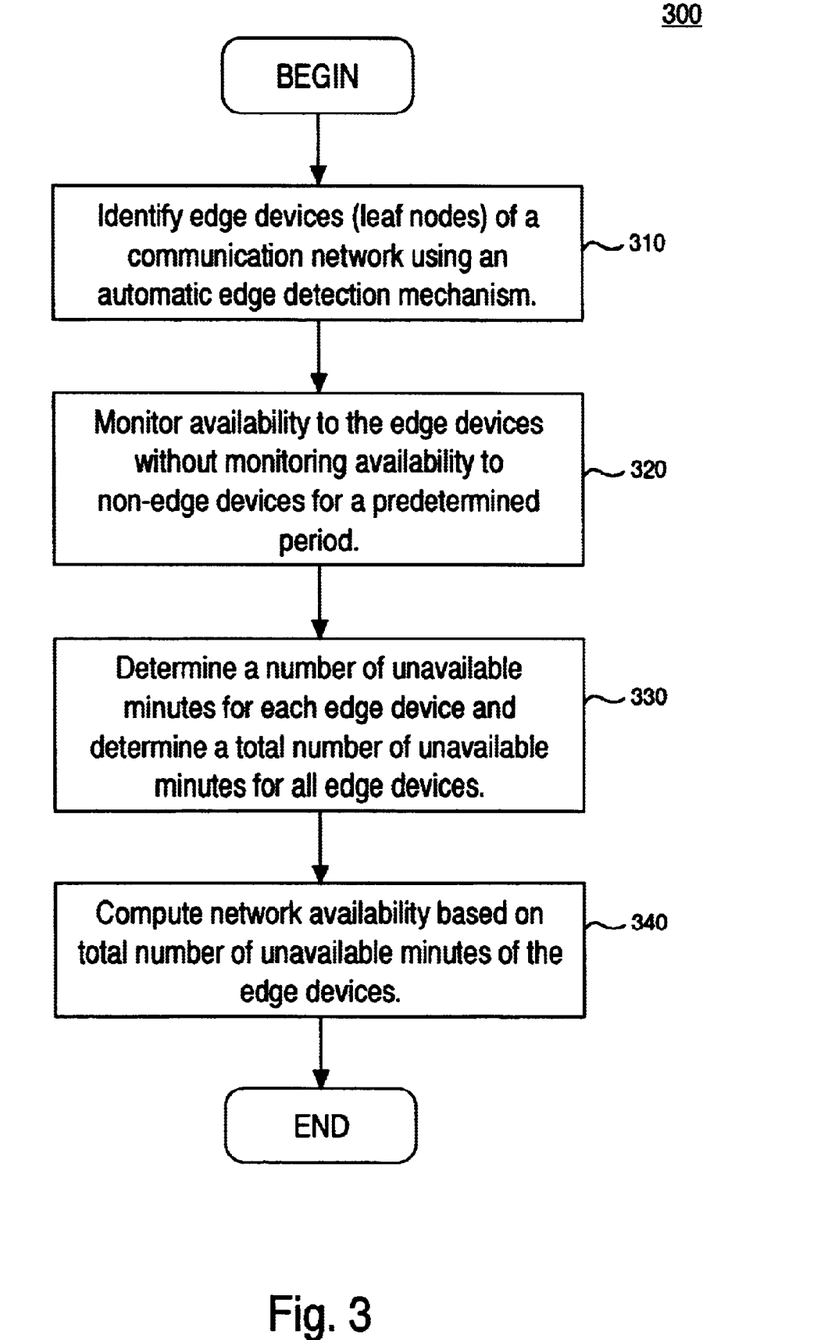
FIG. 3 is a flow diagram illustrating steps of a process of monitoring and measuring network availability in accordance with one embodiment of the present invention.

FIG. 3 is a flow diagram illustrating steps of a process 300 of monitoring and measuring network availability in accordance with one embodiment of the present invention. Process 300 of the present embodiment may be automatically performed by a network availability monitoring device (e.g., NAM 250). As illustrated, at step 310, a leaf node detection mechanism is used to identify the leaf nodes in a communications network. Leaf nodes can be a hubs, switches, or routers, and are typically devices that connect either users or network servers to the network. Using network 200 as an example, the leaf nodes of the network are routers 210a–210b and switches 215a–215b. A leaf node detection mechanism according to one embodiment of the present invention will be described in detail below.

After the leaf nodes of the network are identified, at step 320, process 300 of the present embodiment then monitors availability to these leaf nodes for a pre-determined period of time. In the present embodiment, step 320 determines availability to each leaf node based on ICMP (Internet Control Message Protocol) ping success. That is, network availability data collection device (e.g., NAM 250) sends ICMP pings to the leaf nodes at regular intervals, and monitors the number of ping responses that return. In the present embodiment, the rate at which pings are sent out is user configurable, and is set at a default rate of 2 pings per 2 minutes. Further, the definition of a successful ping response is also user configurable. For instance, in the present embodiment, each ping response returned for every 2 pings that are sent is counted as a success. It should be appreciated that other ping rates and "success" rates may also be used. For instance, in another embodiment, each ping response returned maybe counted as a "success" and each unanswered ping maybe counted as a "failure." Other types of test packets may be used in place of ICMP pings for determining the availability of the leaf nodes.

It should also be noted that, in the present embodiment, availability is not necessarily determined by the total number of pings attempted and the total number of ping responses received. For example, if 60 pings were sent and 57 ping responses are received, it may be determined that the leaf node in question is 100% available if the ping success rate is defined as 50% and that the device responds to at least one of two pings sent during three separate intervals of time. Furthermore, in another embodiment, availability may be determined by the total number of pings attempted and the total number of ping responses received within a reasonable time frame. Thus, if a device does not respond to a ping within a certain period of time (e.g., 1 minute) then the device is considered unavailable even though the device may have responded after 3 minutes.

At step 330, process 300 of the present embodiment determines a number of unavailable minutes for each of the leaf nodes from the availability data collected at step 320. It should be noted that when a leaf node is unavailable, it does not necessarily mean that the leaf node itself is malfunctioning. Rather, one or more intermediary nodes between the network availability data collection device (e.g., NAM 250) and the leaf node may be down, thus causing the pings to be unanswered. In the present embodiment, a total number of unavailable minutes for the network is then calculated by summing all unavailable minutes for all of the leaf nodes.

At step 340, process 300 of the present embodiment then calculates network availability based on the total number of unavailable minutes of the leaf nodes as determined at step 330. In one embodiment of the present invention, network availability is determined on a daily basis and is computed from 00:00 to 23:59 of a day. Specifically, in one embodiment, network availability is computed as the number of unavailable minutes subtracted from the total possible number of available minutes and divided by the total possible number of available minutes. The total possible number of available minutes is equal to the number of monitored leaf nodes times 60 minutes times 24 hours. For example, for a network with five hundred monitored leaf nodes and 20 minutes of unavailability for all the devices in one day, network availability would be calculated by:

$$((500*60*24)-20)/500*60*24*100\%=99.997\%.$$

After the network availability is computed, process 300 ends.

In accordance with one embodiment of the present invention, network availability may also be computed on a monthly basis. For example, network availability may be computed from availability data collected from 00:00 of the first day of the month to 23:59 of the last day of the month. Computation for the monthly report is similar to computation for the daily report but is adjusted to reflect monthly total of availability minutes and monthly total of unavailable minutes.

In accordance with another embodiment of the present invention, leaf nodes that share similar geographic, topology or service characteristics may be placed in a common availability group. Availability groups are valuable because they allow the organization to measure different specific areas of the network that typically have different availability or different support requirements. For instance, all LAN leaf nodes may be placed in a LAN availability group, and all WAN leaf nodes may be placed in a WAN availability group. Network availability is determined for the availability group based on ping success. In one embodiment, network availability for an availability group is calculated based on availability of the leaf nodes within the group during a data collection period.

In furtherance of one embodiment of the present invention, availability groups may be automatically formed using availability group filtering techniques. Availability group filtering identifies edge-devices destined for an availability group based on IP subnet classification, naming convention, device-type or a combination of configurable features. Once all edges have been detected with the network, devices can be filtered based on IP, naming or device-class criteria and then moved to an appropriate availability group. Availability group may also be determined manually.

In another embodiment of the present invention, availability group filtering may be performed before leaf-node detection. In that case, a certain group of devices are first identified based on IP subnet classification, naming convention, geographical location, device type, etc. Then, leaf-node detection is performed for each of the identified groups. Network availability data for the identified groups can then be determined by measuring the availability for the leaf-nodes of each availability group.

The present invention may also measure availability to/from unique locations in the network using an RTR (Response Time Reporter) agent. RTR is also called SAA (Service Assurance Agent). RTR is a software module residing on a Cisco router and allows response time or availability measurement to/from unique points in the network. This special availability measurement is suitable for individual availability groups to identify and measure unique availability requirements.

In accordance with an embodiment of the present invention, redundant leaf-nodes (e.g, redundant network edges) may be identified based on subnet classification. When multiple leaf nodes exist in the same subnet, the process and system of the present embodiment can place these leaf nodes into a leaf-node redundancy group. Availability of a leaf-node redundancy group is measured based on ping success of any one device in the leaf-node redundancy group. That is, if one device in the redundancy group fails the availability test, the edge area of the network is still considered available. It should be appreciated that redundant leaf-nodes can be automatically detected or manually identified.

Leaf Node Detection

1. CDP (Cisco Discovery Protocol) Based Leaf Node Detection

The present invention provides for an automatic leaf node detection mechanism for identifying leaf nodes of a network. In one embodiment, the automatic leaf node detection mechanism is based on Cisco Discovery Protocol (CDP) and uses CDP relationships between routers and switches to identify leaf nodes. The leaf node detection mechanism of the present embodiment is based on current enterprise and service provider network design rules for scaleable IP (Internet Protocol) networks.

Figure 4:
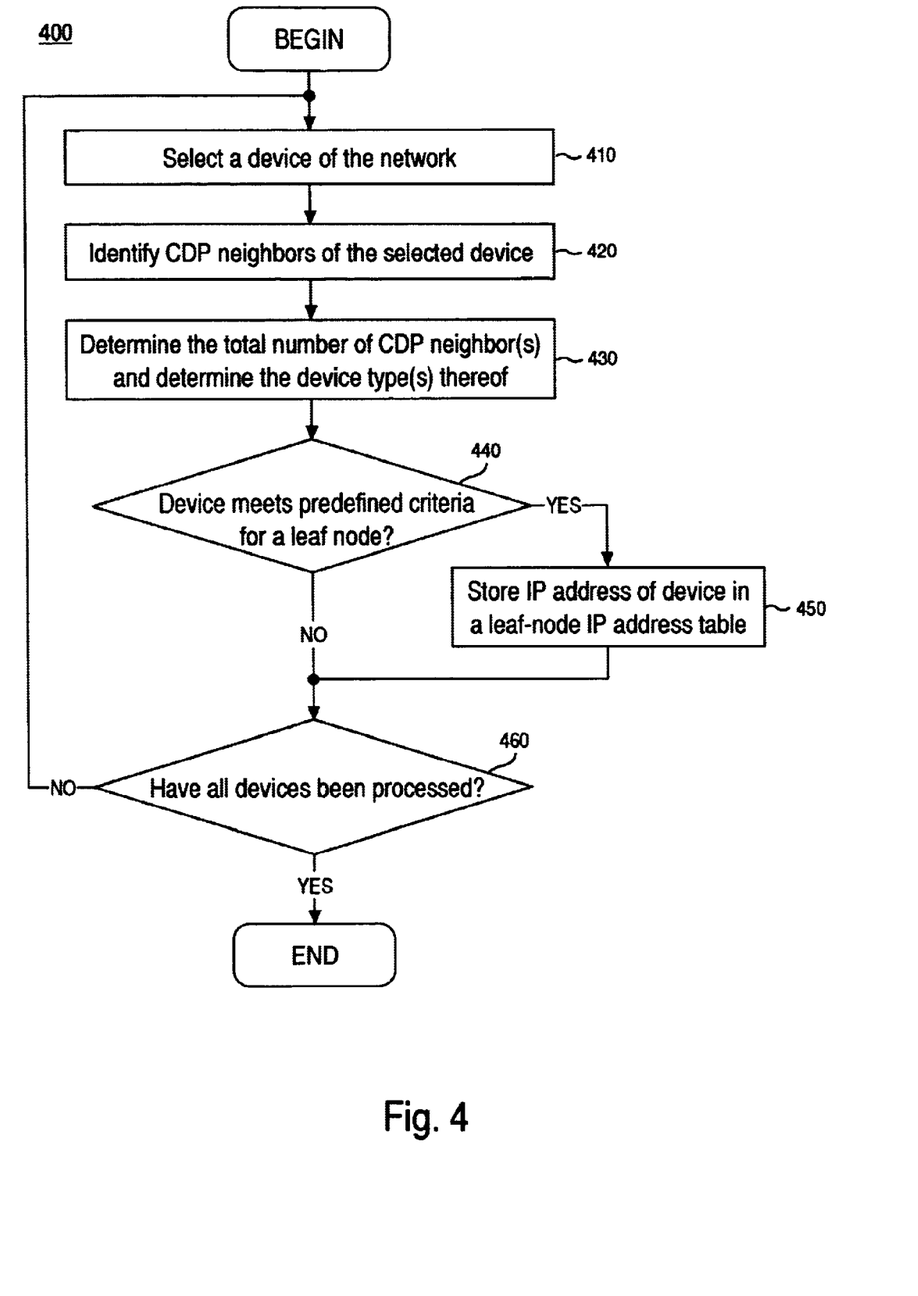
FIG. 4 is a flow diagram illustrating steps of a process for automatic leaf node detection in accordance with an embodiment of the present invention.

FIG. 4 is a flow diagram illustrating steps of a process 400 for automatic leaf node detection in accordance with an embodiment of the present invention. Process 400 of the present embodiment may be automatically performed by a network availability monitoring device (e.g., NAM 250). As illustrated, at step 410, a device of the network is selected and its device type is identified. According to the present embodiment, the device type can be one of the following: a router, a switch or a RSM (Route Switch Module).

At step 420, process 400 identifies the CDP neighbor(s) of the device through SNMP (Simple Network Message Protocol). In accordance with the present embodiment, it is assumed that CDP is enabled on all the devices in the network. Process 400 of the present embodiment may be performed by a network availability monitoring device (e.g., NAM 250). In addition, it is assumed that SNMP is enabled on all the devices and that the read community strings are available.

At step 430, process 400 determines the total number of CDP neighbor(s) and their device type(s).

At step 440, it is determined whether the device is a leaf node based on its own device type and the device types and the number of the device's CDP neighbors. In the present embodiment, whether a device is a leaf node can be determined based on rules illustrated in Table 1 below.

TABLE I

| Device type | Device Interface | Neighbor Type per interface | | | Action |
| --- | --- | --- | --- | --- | --- |
| | | Number of Router | Number of Switch | Number of RSM | |
| Switch | N/A | 0 | 0 | 0 | SC0 IP address inserted as edge interface |
| Switch | N/A | 0 | 1 | 0 | SC0 IP address inserted as edge interface |
| Switch | N/A | 0 | 2 | 0 | SC0 IP address inserted as edge interface |
| Switch | N/A | 0 | 3+ | 0 | No edge interface |
| Switch | N/A | 1 | 0 | 0 | SC0 IP address inserted as edge interface |
| Switch | N/A | 1 | 1 | 0 | SC0 IP address inserted as edge interface |
| Switch | N/A | 1 | 2+ | 0 | No edge interface |
| Switch | N/A | 2 | 0 | 0 | SC0 IP address inserted as edge interface |
| Switch | N/A | 2 | 1 | 0 | SC0 IP address inserted as edge interface |
| Switch | N/A | 2 | 2+ | 0 | No edge interface |
| Switch | N/A | 3+ | X | X | No edge interface |
| Switch | N/A | X | X | 1+ | No edge interface |
| Router | LAN (1) | 0 | 0 | 0 | Router interface IP address inserted as edge interface |
| Router | LAN | 1 | 0 | 0 | Router interface IP address inserted as edge interface |
| Router | LAN | 2+ | 0 | 0 | No edge interface |
| Router | LAN | X | 1+ | 0 | No edge interface |
| Router | LAN | X | X | 1+ | No edge interface |
| Router | WAN (2) | X | X | X | No edge interface |
| RSM | VLAN | X | X | X | No edge interface |

Note (1): LAN interface defined as Ethernet, Fast Ethernet, Gigabit Ethernet, Token Ring or FDDI.
Note (2): WAN interface defined as Serial, POSIP, HSSI, ATM, DSL or any other interface not explicitly defined as a LAN interface.
Note (3): An SC0 IP address is the IP address of the management VLAN on Cisco Catalyst switches.

At step 450, if the device meets the criteria shown in Table 1 above, its IP address is placed in a leaf node IP address table. In one embodiment, the leaf node IP address table is maintained by network availability monitoring device (e.g., NAM 250) Then, at step 460, it is determined whether all the devices of the network have been processed. If it is determined that all the devices of the network are processed, process 400 ends. Otherwise, steps 410–450 are repeated for other devices of the network.

2. Subnet Based Leaf Node Detection

Figure 5:
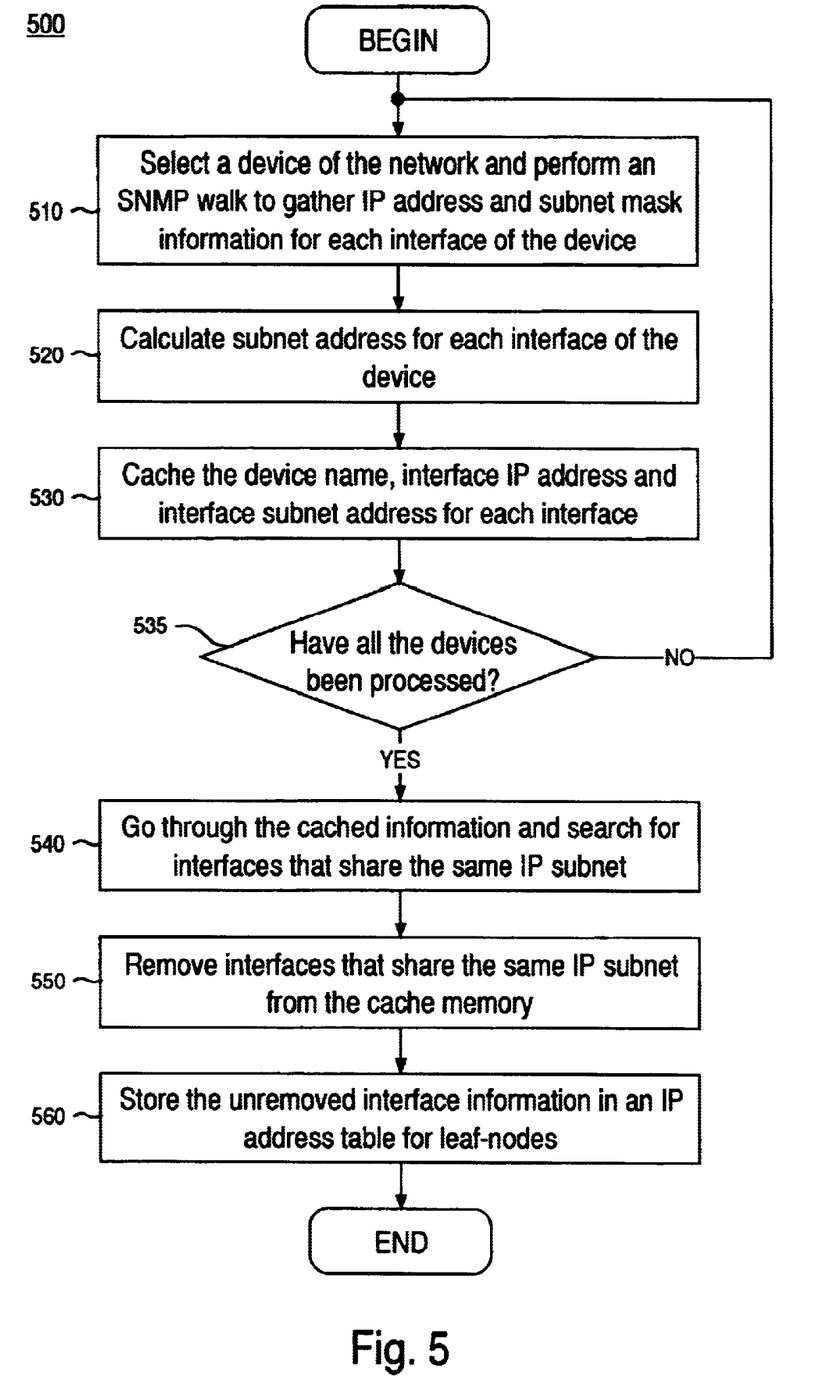
FIG. 5 is a flow diagram illustrating steps of a process for automatic leaf node detection in accordance with another embodiment of the present invention.

FIG. 5 is a flow diagram illustrating steps of a process 500 for automatic leaf node detection in accordance with another embodiment of the present invention. Process 500 of the present embodiment may be performed automatically by a network availability monitoring device (e.g., NAM 250). As illustrated, at step 510, a device of the network is identified, and an SNMP walk is performed to gather the IP address and subnet mask information for each interface. In the present embodiment, it is assumed that routers and switches may have multiple interfaces and that SNMP is enabled on all the devices and the read community strings are available.

At step 520, process 500 of the present embodiment calculates the subnet address for each interface of the device.

At step 530, the device name, interface IP addresses and interface IP subnet addresses are cached.

At step 535, it is determined whether all the devices have been processed. If not, steps 510–530 are repeated for other devices of the network.

If all the devices have been processed at step 535, then, at step 540, process 500 goes through the cached information and determines whether two or more interfaces are in the same IP subnet.

At step 550, if it is determined that two or more interfaces are in the same IP subnet, these interfaces are assumed to be connected and hence not leaf nodes. These non-leaf node interfaces are then removed from the cache memory.

At step 560, the unremoved IP addresses are assumed to be leaf nodes, and are stored within a leaf node IP address table. The leaf node IP address table, in the present embodiment, is maintained by network availability monitoring device (e.g., NAM 250) for use in determining network availability.

Thereafter, the process 500 ends.

Auto Annotation

The present invention also provides an auto-annotation process that assists network engineers in pinpointing network problems. Unlike network event management tools, which look at all network management events to create a trouble ticket that helps to identify a problem and create one trouble ticket for a set of network management information, the auto-annotation mechanism of the present invention identifies problem root causes based on network availability, and not on the collection of a set of network management information.

In accordance with one embodiment of the present invention, auto annotation is used for gathering failure information regarding a period of non-availability in order to categorize that failure and determine root cause. In the present embodiment, failures are categorized into six groups that include: (1) hardware failures, (2) software failures, (3) link failures, (4) power failures, (5) configuration change errors and (6) unknown failures. Further, in the present embodiment, three categories exist for root cause confidence: (1) confident, (2) probable and (3) potential causes. This information is valuable for network engineers in determining the causes of non-availability and helps identify key network improvement initiatives needed to improve network availability.

Figure 6:
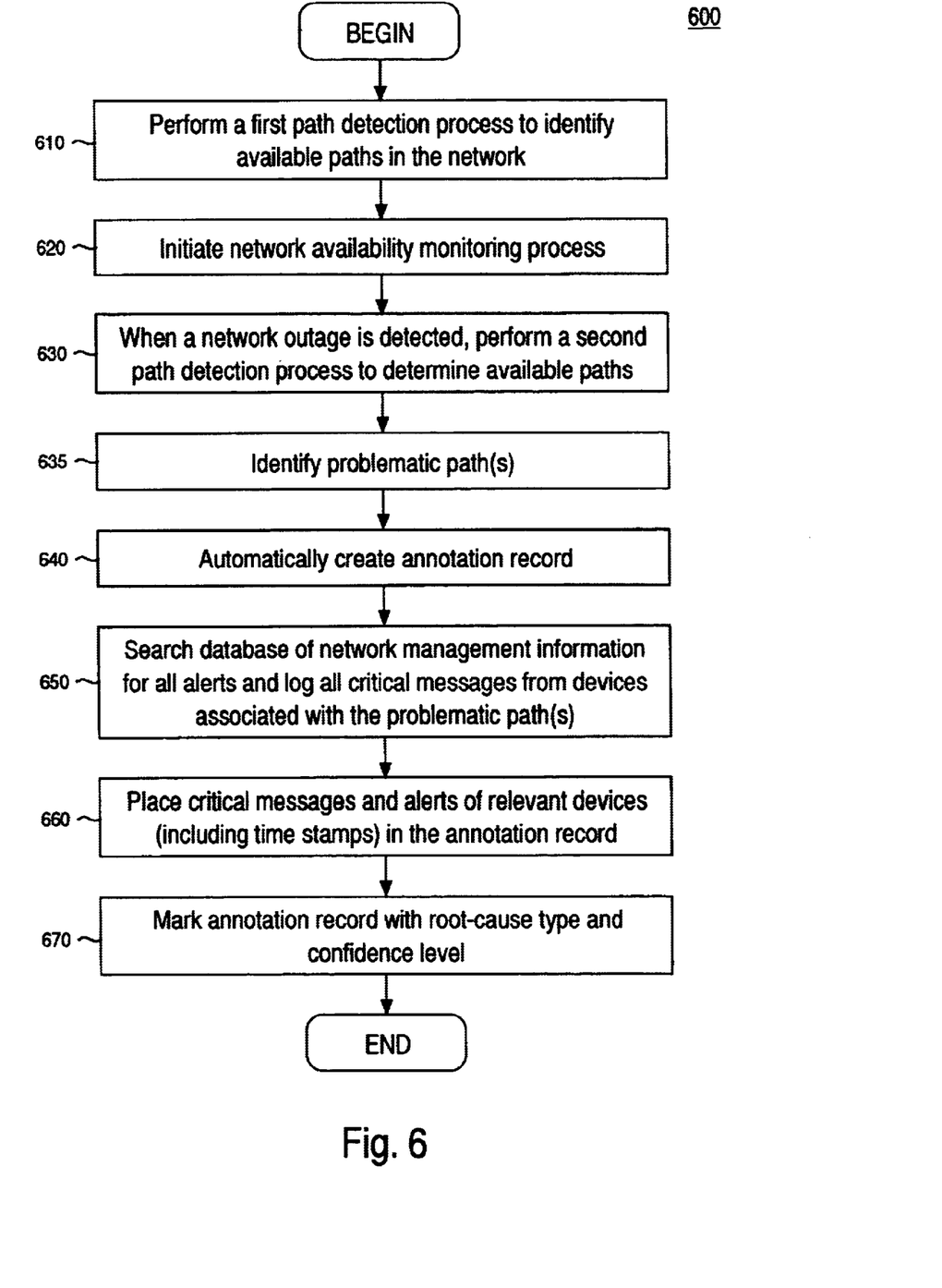
FIG. 6 is a flow diagram illustrating steps of an auto-annotation process in accordance with one embodiment of the present invention.

According to the present invention, auto-annotation is a process that requires initial processing as well as post availability problem processing. FIG. 6 is a flow diagram illustrating steps of an auto-annotation process in accordance with one embodiment of the present invention. Process 600 of the present embodiment may be automatically performed by a network availability monitoring device (e.g., NAM 250).

As illustrated, at step 610, a path detection process is performed for identifying availability paths in the network. In the present embodiment, an availability path includes routers and switches positioned between two measurement endpoints. Individual paths are placed in a database for each measurement path. Existing path identification is determined daily to accommodate for change. In one embodiment, step 610 is also known as pre-availability problem route tracing.

At step 620, a network availability monitoring process (e.g., process 200) is initialized for the network.

At step 630, when a network outage occurs, as detected by network availability monitoring process initiated at step 620, another path detection process is performed. In one embodient, step 630 is also known as post-availability problem route tracing.

At step 635, failed network paths are identified by comparing the routes identified at step 610 and routes identified at step 630. The results may include the identification of one or more intermediary routers and/or switches that malfunctioned.

At step 640, an annotation record is automatically created. In the present embodiment, the annotation record includes the results of the failed path detection process of step 635.

At step 650, process 600 searches a database of network management information for all alerts, and logs all critical messages from devices related to the failed path(s) determined at step 635 within a six-minute window. That is, process 600 searches a the network management information database for all alerts and critical messages that are dated between 3 minutes before the network outage and 3 minutes after the network outage. Network management information databases, or network analysis databases such as NATKit (available from Cisco Systems, Inc.), are network management applications used by network support organizations to proactively collect network information from a customer network and report results back to the network support organizations, and are well known in the art. Therefore, they are not described herein in detail to avoid obscuring aspects of the present invention.

At step 660, critical messages from devices, including their time stamps, are placed in the annotation record in association with the malfunctioning devices, if any, as determined at step 630.

At step 670, based on a rules engine for root cause confidence, the annotation record is marked with the root cause type and confidence level.

Thereafter, the auto-annotation process 600 of the present embodiment ends.

Figure 7:
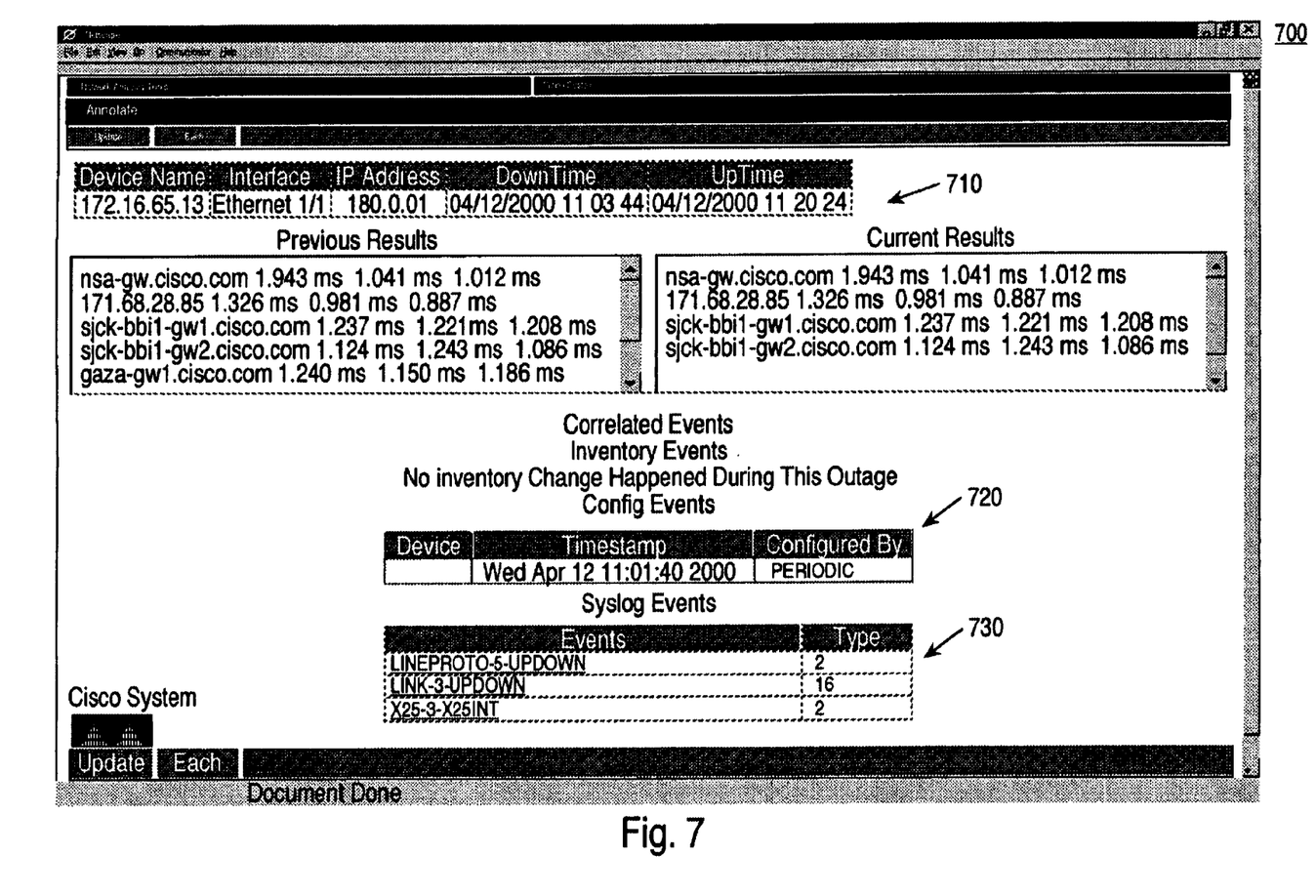
FIG. 7 illustrates an exemplary annotated record in accordance with one embodiment of the present invention.

An exemplary annotated record 700 generated by process 600 in accordance with the present embodiment is illustrated in FIG. 7. As illustrated, annotated record 700 includes device information 710 for a leaf node "172.16.65.13" that went down. Annotated record 700 further includes a configuration events list 720 and a syslog events list 730. In the present embodiment, configuration events list 720 lists devices that underwent configuration changes shortly before the device "172.16.65.13" became unavailable. Syslog events list 730 lists the alerts and critical messages pertinent to devices that reported errors shortly before the device "172.16.65.13" became unavailable. By annotating device information 710 with correlated events list 720, the present embodiment provides significant assistance to network engineers in pinpointing the root cause of the network problem.

The present invention, a method and system for measuring and improving network availability, has thus been disclosed. By monitoring availability of leaf nodes and without monitoring non-leaf nodes, the present invention provides a method and system for measuring network availability that is scaleable and that accounts for redundancy in the network. Further, because only the availability of leaf nodes are monitored, network availability information more accurately reflects what users perceive as network availability. While the present invention has been described in particular embodiments, it should be appreciated that the present invention should not be construed as limited by such embodiments, but should be construed according to the claims below.

What is claimed is:

1. A method of measuring availability of a network having a plurality of nodes, the method comprising steps of:
   a) identifying which of said nodes are leaf nodes and which of said nodes are non-leaf/nodes wherein each of said nodes is either a leaf node or a non-leaf node;
   b) monitoring availability of a set of said plurality of nodes consisting solely of leaf nodes over a pre-determined period of time;
   c) generating leaf node availability data for each one of said set of nodes; and
   d) generating network availability information for said network as a whole based on said leaf node availability data,
   wherein said step (d) comprises steps of:
      calculating a total number of available minutes for said set of nodes over said pre-determined period of time based on said leaf node availability data;
      calculating a total possible number of available minutes for said set of nodes over said pre-determined period of time determining a ratio between said total number of available minutes and said total possible number of available minutes.

2. A method as recited in claim 1 wherein said step (a) comprises steps of:
   identifying a plurality of neighboring nodes for each respective one of said plurality of nodes by using CDP (Cisco Discovery Protocol); and determining whether said respective node is a leaf node or a non-leaf node based on characteristics of said respective node and said plurality of neighboring nodes.

3. A method as recited in claim 1 wherein said step (b) comprises steps of:
   sending test packets to each one of said set of nodes at regular intervals over said pre-determined period of time; and
   counting test packet responses from each one of said set of nodes.

4. A method as recited in claim 3 further comprising step of creating a record annotating a respective node of said set when ping responses from said respective node are not returned.

5. A method as recited in claim 4 further comprising steps of: after said step of creating, searching a database of network management information for alerts and critical messages generated by devices associated with said respective node; and
   storing said alerts and critical messages in said record.

6. A computer-readable medium having contained therein computer-readable codes for causing a computer system to perform a method of measuring availability of a network having a plurality of nodes, the method comprising steps of:

a) identifying which of said nodes are leaf nodes and which of said nodes are non-leaf nodes wherein each of said nodes is either a leaf node or a non-leaf node;

b) monitoring availability of a set of said plurality of nodes consisting solely of leaf nodes over a pre-determined period of time;

c) generating leaf node availability data for each one of said set of nodes; and d) generating network availability information for said network as a whole based on said leaf node availability data, wherein said step (d) of said method comprises steps of:
calculating a total number of available minutes for said set of nodes over said pre-determined period of time based on said leaf node availability data;
calculating a total possible number of available minutes for said set of nodes over said pre-determined period of time
determining a ratio between said total number of available minutes and said total possible number of available minutes.

7. A computer readable medium as recited in claim 6 wherein said step (a) of said method comprises steps of:
identifying a plurality of neighboring nodes for each respective one of said plurality of nodes by using CDP (Cisco Discovery Protocol); and
determining whether said respective node is a leaf node or a non-leaf node based on characteristics of said respective node and said plurality of neighboring nodes.

8. A computer readable medium as recited in claim 6 wherein said step (b) of said method comprises steps of:
sending test packets to each one of said set of nodes at regular intervals over a predetermined period of time; and
counting test packet responses from each one of said set of nodes.

9. A computer readable medium as recited in claim 8 wherein said method further comprises step of creating a record annotating a respective node of said set when ping responses from said respective node are not returned.

10. A computer readable medium as recited in claim 9 wherein said method further comprises steps of:
after said step of creating, searching a database of network management information for alerts and critical messages, generated by devices associated with said node; and
storing said alerts and critical messages in said record.

11. A network availability monitor for coupling to and measuring availability of a network that has a plurality of nodes, said network availability monitor comprising:
logic for identifying which of said nodes are leaf nodes and which of said nodes are non-leaf nodes wherein each of said nodes is either a leaf node or a non-leaf node;
logic for monitoring availability of a set of said plurality of nodes consisting solely of leaf nodes; and
logic for generating leaf node availability data for each one of said set of nodes and for generating network availability information for said network as a whole based on said leaf node availability data,
wherein said logic for generating comprises:
logic for calculating a total number of available minutes for said set of nodes over said pre-determined period of time based on said leaf node availability data;
logic for calculating a total possible number of available minutes for said set of nodes over said pre-determined period of time logic for determining a ratio between said total number of available minutes and said total possible number of available minutes.

12. A network availability monitor as recited in claim 11 wherein said logic for identifying comprises:
logic for identifying a plurality of neighboring nodes for each respective one of said plurality of nodes by using CDP (Cisco Discovery Protocol); and
logic for determining whether said respective node is a leaf node or a non-leaf node based on characteristics of said respective node and said plurality of neighboring nodes.

13. A network availability monitor as recited in claim 11 wherein said logic for monitoring comprises:
logic for sending test packets to each one of said set of nodes at regular intervals over a predetermined period of time; and
logic for counting test packet responses from each one of said set of nodes.

14. A network availability monitor as recited in claim 13 further comprising logic for creating a record annotating a respective node of said set when ping responses from said respective node are not returned.

15. A network availability monitor as recited in claim 13 further comprising:
logic for searching a database of network management information for alerts and critical messages generated by devices associated with said respective node; and
logic for storing said alerts and critical messages in said record.

16. A method of measuring availability of a network that has a plurality of nodes, said method comprising steps of:
a) identifying which of said nodes are leaf nodes and which of said nodes are non-leaf nodes wherein each of said nodes is either a leaf node or a non-leaf node;
b) monitoring availability of a set of said plurality of nodes consisting solely of leaf nodes, said set comprising a first leaf node and a second leaf node wherein said first leaf node and said second leaf node belong to a pre-determined availability group;
c) generating first leaf node availability data for said first leaf node;
d) generating second leaf node availability data for said second leaf node; and
e) generating network availability information for said availability group based on said first leaf node availability data and said second leaf node availability data,
wherein said step (d) comprises steps of:
calculating a total number of available minutes for said set of nodes over said pre-determined period of time based on said leaf node availability data;
calculating a total possible number of available minutes for said set of nodes over said pre-determined period of time determining a ratio between said total number of available minutes and said total possible number of available minutes.

17. A method as recited in claim 16 wherein said step (a) comprises steps of:
identifying a plurality of neighboring nodes for each respective one of said plurality of nodes by using CDP (Cisco Discovery Protocol); and determining whether said respective node is a leaf node or a non-leaf node based on characteristics of said respective node and said plurality of neighboring nodes.

18. A method as recited in claim 16 wherein said step (b) comprises steps of:
sending test packets to said first leaf node and said second leaf node at regular intervals over a predetermined period of time; and
counting test packet responses from said first leaf node and said second leaf node.

19. A method as recited in claim 18 further comprising step of
creating a record annotating said first leaf node when said ping responses from said first leaf node are not returned.

20. A method as recited in claim 19 further comprising steps of:
after said step of creating, searching a database of network management information for alerts and critical messages generated by devices associated with said first leaf node; and storing said alerts and critical messages in said record.

* * * * *